(12) United States Patent
Eriksson et al.

(10) Patent No.: US 10,425,874 B2
(45) Date of Patent: *Sep. 24, 2019

(54) METHODS AND ARRANGEMENTS FOR MANAGING RADIO LINK FAILURES IN A WIRELESS COMMUNICATION NETWORK

(71) Applicant: Telefonaktiebolaget LM Ericsson (publ), Stockholm (SE)

(72) Inventors: Erik Eriksson, Linköping (SE); Pradeepa Ramachandra, Linköping (SE); Reza Moosavi, Linköping (SE); Joel Berglund, Linköping (SE); Mirsad Cirkic, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/543,460

(22) PCT Filed: Mar. 2, 2015

(86) PCT No.: PCT/SE2015/050234
§ 371 (c)(1),
(2) Date: Jul. 13, 2017

(87) PCT Pub. No.: WO2016/140599
PCT Pub. Date: Sep. 9, 2016

(65) Prior Publication Data
US 2018/0007605 A1 Jan. 4, 2018

(51) Int. Cl.
*H04W 36/30* (2009.01)
*H04W 76/10* (2018.01)
(Continued)

(52) U.S. Cl.
CPC ........... *H04W 36/30* (2013.01); *H04W 24/08* (2013.01); *H04W 24/10* (2013.01);
(Continued)

(58) Field of Classification Search
CPC . H04W 36/30; H04W 72/1268; H04W 76/10; H04W 24/08; H04W 24/10
(Continued)

(56) References Cited

U.S. PATENT DOCUMENTS 9,883,422 B2 * 1/2018 Liu ................. H04W 76/19
2010/0173633 A1 * 7/2010 Catovic ............ H04W 76/18
455/436

(Continued)

FOREIGN PATENT DOCUMENTS

EP          2903388 A1 *  8/2015  ............ H04W 76/19
WO    WO 2014077766 A1     5/2014
(Continued)

OTHER PUBLICATIONS

Supplementary Partial European Search Report—EP 15884101.5—dated Mar. 6, 2018—pp. 4.
(Continued)

*Primary Examiner* — Shahriar Behnamian
(74) *Attorney, Agent, or Firm* — Sage Patent Group

(57) ABSTRACT

Radio link failures, "RLF", of a wireless device served by a wireless communication network are managed. A first, default, RLF procedure is associated with at least a first type of wireless devices supported by the wireless communication network. The wireless device obtains, e.g. received from a network node information indicative of a second RLF procedure based on that the wireless device is of a second type having an improved radio coverage capability compared to the first type. The wireless device applies, based on the obtained information, said second RLF procedure.

19 Claims, 8 Drawing Sheets

(51) Int. Cl.

| | | |
|---|---|---|
| *H04W 24/10* | (2009.01) | |
| *H04W 24/08* | (2009.01) | |
| *H04W 72/12* | (2009.01) | |
| *H04W 24/02* | (2009.01) | |
| *H04W 88/02* | (2009.01) | |
| *H04W 88/08* | (2009.01) | |

(52) U.S. Cl.
CPC ....... *H04W 72/1268* (2013.01); *H04W 76/10* (2018.02); *H04W 24/02* (2013.01); *H04W 88/02* (2013.01); *H04W 88/08* (2013.01)

(58) Field of Classification Search
USPC .......................................................... 455/436
See application file for complete search history.

(56) References Cited

U.S. PATENT DOCUMENTS

| | | | | |
|---|---|---|---|---|
| 2014/0080468 | A1* | 3/2014 | Zhang .................. | H04W 24/02 455/418 |
| 2014/0098761 | A1* | 4/2014 | Lee ..................... | H04W 74/006 370/329 |
| 2015/0045035 | A1* | 2/2015 | Nigam ................. | H04W 36/30 455/436 |
| 2015/0271763 | A1* | 9/2015 | Balachandran ........ | H04B 17/23 370/338 |
| 2016/0007252 | A1* | 1/2016 | Larmo .............. | H04W 36/0088 370/332 |
| 2016/0219644 | A1* | 7/2016 | Zhao .................... | H04W 76/12 |

FOREIGN PATENT DOCUMENTS

| | | |
|---|---|---|
| WO | 2014182229 A1 | 11/2014 |
| WO | 2014206489 A1 | 12/2014 |
| WO | 2015020321 A1 | 2/2015 |
| WO | 2015023449 A2 | 2/2015 |

OTHER PUBLICATIONS

Author Unknown, "Technical Specification Group Radio Access Network; Evolved Universal Terrestrial Radio Access (E-UTRA); Requirements for support of radio resource management (Release 12)," Technical Specification 36.133, Version 12.5.0, Sep. 2014, 3GPP Organizational Partners, Sep. 2014, 877 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.3.0, 3GPP Organizational Partners, Sep. 2014, 378 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 124.1, 3GPP Organizational Partners, Dec. 2014, 410 pages.

International Search Report and Written Opinion for International Patent Application No. PCT/SE2015/050234, dated Nov. 27, 2015, 9 pages.

* cited by examiner

METHODS AND ARRANGEMENTS FOR MANAGING RADIO LINK FAILURES IN A WIRELESS COMMUNICATION NETWORK

This application is a 35 U.S.C. § 371 national phase filing of International Application No. PCT/SE2015/050234, filed Mar. 2, 2015, the disclosure of which is incorporated herein by reference in its entirety.

TECHNICAL FIELD

Embodiments herein relate to methods and network nodes in a wireless communication network, e.g. telecommunication network, for managing Radio Link Failures (RLF) of a wireless device served by the wireless communication network.

BACKGROUND

Communication devices such as wireless devices may also be known as e.g. user equipments (UEs), mobile terminals, wireless terminals and/or mobile stations. A wireless device is enabled to communicate wirelessly in a cellular communication network, wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Special Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

Handover refers to the action of handing over a wireless device being served in a serving cell to another, target cell to instead being served in there, e.g. in order to enable seamless service provision during mobility, i.e. when the wireless device moves. Decisions whether to perform handover or not are based on handover parameters and measurements performed by the wireless device on a serving, source cell and on neighbouring, potential target cells for the handover. The handover parameters for example determine conditions or criteria to be fulfilled by the measurements in order for handover to be carried out. If the handover parameters are set in such a way that the wireless device doesn't report handover measurements in time, the wireless device might lose the connection with the source cell before a handover is initiated. The wireless device can also lose a connection if the wireless device enters a so called coverage hole where there e.g. is not sufficient radio coverage. As described in 3GPP TS 36.331, version 12.4.1, "Radio Resource Control", chapter 5.3.11.1, when the wireless device receives a certain number, named N310, of consecutive "out of sync" indications from a lower layer, it assumes a physical layer problem is ensuing, and a timer, named T310, is started. If the wireless device doesn't receive a certain number, named N311, of consecutive "in sync" indications from the lower layer before the T310 expires, Radio Link Failure (RLF) is detected.

Radio link failure is a functionality that should "protect" the wireless device communication when network based mobility does not work properly, e.g. so that a wireless device when losing sufficient radio coverage from a currently serving cell, but before receiving a command to go to a different cell, may select a different cell, using the same or different carrier frequency and/or RAT.

When an RLF, or HandOver Failure (HOF), is detected by the wireless device, the wireless device starts a timer, named T311, and tries to re-establish the connection to the best available cell. See e.g. 3GPP TS 36.331, version 12.4.1, "Radio Resource Control", chapter 5.3.7.2.

From the above observations regarding the existing RLF occurrence and recovery procedure, one can say that the major disadvantage of the RLF is that there will be a service discontinuity when the wireless device undergoes RLF. This interruption will cause performance degradation. An example of this is given in the following with reference to FIG. 1. A wireless device is assumed to be moving in an LTE wireless communication network and its Reference Signal Received Power (RSRP) as a function of time is shown in FIG. 1. The wireless device calculates thresholds, named Th1 and Th2 in FIG. 1, for declaring out-of-sync (lower line, Th1) and in-sync (upper line, Th2) based on received quality regarding Cell specific Reference Symbols (CRS) where the thresholds are set based on expected block-error rate for specific messages on a Physical Downlink Control Channel (PDCCH), see e.g. 3GPP TS 36.133, version 12.5.0, section 7.6. Below this lower value the wireless device starts to count the number of times it observes consecutive out-of-sync measurements. If this count exceeds the pre-configured number N310 then the wireless device will start the RLF timer T310. In the example of FIG. 1, the wireless device starts the T310 timer at time T1. If the wireless device fails to find sync within the expiry of the pre-defined duration of the T310 timer, then the wireless device will declare RLF. In the example of FIG. 1, the wireless device declares RLF at T2.

SUMMARY

An object is to provide one or more improvements with regard to how RLFs are being managed in a wireless communication network.

According to a first aspect of embodiments herein, the object is achieved by a method, performed by a wireless device, for managing radio link failures, "RLF", of the wireless device when the wireless device is served by a wireless communication network. A first, default, RLF procedure is associated with at least a first type of wireless devices supported by the wireless communication network. The wireless device obtains information indicative of a second RLF procedure based on that the wireless device is of a second type having an improved radio coverage capability compared to the first type. The wireless device applies, based on the obtained information, said second RLF procedure.

According to a second aspect of embodiments herein, the object is achieved by a computer program comprising instructions that when executed by a processing circuit causes the source radio network node to perform the method according to the first aspect.

According to a third aspect of embodiments herein, the object is achieved by a data carrier comprising the computer program according to the second aspect.

According to a fourth aspect of embodiments herein, the object is achieved by a method, performed by a network node, for supporting a wireless device to manage RLFs when the wireless device is served by a wireless communication network. The network node is comprised in the wireless communication network. A first, default, RLF procedure is associated with at least a first type of wireless devices supported by the wireless communication network. The network node obtains information indicative of a second RLF procedure based on that the wireless device is of a second type having an improved radio coverage capability compared to the first type. The network node sends the obtained information to the wireless device.

According to a fifth aspect of embodiments herein, the object is achieved by a computer program comprising instructions that when executed by a processing circuit causes the target radio network node to perform the method according to the fourth aspect.

According to a sixth aspect of embodiments herein, the object is achieved by a data carrier comprising the computer program according to the fifth aspect.

According to a seventh aspect of embodiments herein, the object is achieved by a wireless device for managing RLFs when the wireless device is served by a wireless communication network. A first, default, RLF procedure is associated with at least a first type of wireless devices supported by the wireless communication network. The wireless device is configured to obtain information indicative of a second RLF procedure based on that the wireless device is of a second type having an improved radio coverage capability compared to the first type. The wireless device is further configured to apply, based on the obtained information, said second RLF procedure.

According to an eight aspect of embodiments herein, the object is achieved by a network node for supporting a wireless device to manage RLFs when the wireless device is served by a wireless communication network. The network node is configured to be comprised in the wireless communication network. A first, default, RLF procedure is associated with at least a first type of wireless devices supported by the wireless communication network. The network node is configured to obtain information indicative of a second RLF procedure based on that the wireless device is of a second type having an improved radio coverage capability compared to the first type. The network node is further configured to send the obtained information to the wireless device.

Embodiments herein, through introduction and application of the second RLF procedure, enables wireless devices, such as the wireless device of the second type, with improved radio coverage capability compared to other wireless devices of the first type, to function and not be considered to be in a state of RLF when located in a coverage hole for wireless devices of the first type. Embodiments herein enables avoidance of interruption and signaling caused by unnecessary radio link failure that may be caused by that a wireless device with improved radio coverage capability may have this capability with regard to ordinary traffic but not for reference signals used for RLF measurements. This may e.g. the case when the improved radio cover capability is based on beamforming. Hence, embodiments herein provide improvement with regard to how RLFs are being managed.

Additionally, embodiments herein enable detection of coverage holes, which can be automated, by use of one or more wireless devices of the second type applying the second RLF procedure. By additionally configuring, through the obtained information and based on the first RLF procedure, the wireless device to generate the measurement report, the measurement report can be used for the detection of coverage holes.

BRIEF DESCRIPTION OF THE DRAWINGS

Examples of embodiments herein are described in more detail with reference to the appended schematic drawings, which are briefly described in the following.

DETAILED DESCRIPTION

With the introduction of Demodulation Reference Signals (DMRS) based beamforming on data and control in LTE standard releases 10 and 11, the coverage of wireless device supporting release 11 may be different compared to a wireless device supporting only release 8 since beamforming may be used to enhance coverage for both data and control signals. However, since the RLF timer is still based on Cell specific Reference Symbol (CRS) quality, both release 8 and release 11 wireless devices will declare radio link failure at the same time. In other words, with e.g. new beamforming abilities in base stations, radio coverage for a wireless device can be extended significantly. However, beamforming of common signals, e.g. reference signals such as CRS, is not possible. A wireless device may hence have a very good data connection but still declare RLF resulting in reduced performance of both the wireless device and network, and also increased power consumption of the wireless device.

Hence, it would be an improvement with regard to how RLFs are being managed in a wireless communication network if it can be avoided that a wireless device having a very good data connection still declare RLF.

Figure 2:
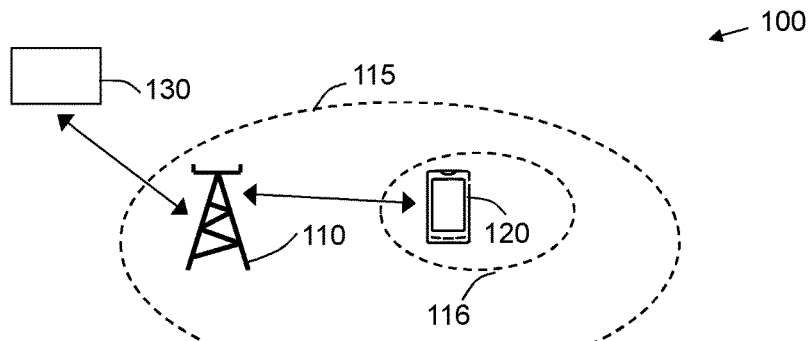
FIG. 2 is a block diagram schematically depicting an example of a wireless communication network in which embodiments herein may be implemented.

FIG. 2 depicts an example of a wireless communication network 100, e.g. a telecommunication network. The wireless communication network 100 comprises a cell 115, indicated in the figure by a perimeter of its coverage area. The cell 115, or at least radio coverage thereof, is provided by a base station 110 comprised in the wireless communication network 100, or more particularly in a Radio Access Network (RAN) part thereof. The figure also shows a coverage hole 116 being a subarea where problems are associated with the radio coverage so that at least some wireless devices, such as of a first type, cannot be served therein by the wireless communication network 100, e.g. by the base station 110. The subarea corresponding to the coverage hole 116 may be located within an area with sufficient radio coverage for serving said wireless devices, which is illustrated in the figure by that the coverage hole 116 is located within the area of the cell 115.

A wireless device 120 shown in the figure is served in the wireless communication network 100, e.g. in the cell 115 by the base station 110. The wireless device 120 is of a second type having an improved radio coverage capability compared to wireless devices of said first type. The improved radio compatibility may be based on beamforming and/or on an extended coverage mode of operation. For example, the improved radio compatibility may e.g. be accomplished by support of a transmission mode associated with a control channel configuration enabling beamforming, or by support of an extended coverage mode of operation including e.g. repetition of data or control signals. By repetition, energy can be accumulated such that the probability of correct decoding is increased. With repetition, the coverage can be increased at a cost of increased resource usage. A default RLF procedure may be designed for the first type and may be needed to be supported and used as long as the wireless communication network 100 supports wireless devices of the first type. The first type may e.g. be so called legacy wireless devices, i.e. typically more conventional, older and/or simpler, wireless devices, at least with regard to radio properties, while the second type may be later and more advanced wireless devices, at least with regard to radio properties.

Further, the wireless communication network 100 may comprise a core network node 130, e.g a management node, comprised in a core network part of the wireless communication network 100. The management node may be a so called Operation and Maintenance (OAM) node that is at least partly controlled by an operator of the wireless communication network 100.

The wireless communication network 100 may be an LTE or LTE based network, but may alternatively be any cellular network or system, such as an, or based on an, UMTS, WCDMA, WCDMA/HSPA, LTE or GSM network, or any 3GPP cellular network.

Attention is drawn to that FIG. 2 is only schematic and for exemplifying purpose and that not everything shown in the figure may be required for all embodiments herein, as will be evident to the skilled person. Also, a wireless communication network that in reality corresponds to the wireless communication network 100 typically comprises several further network nodes, base stations, cells etc., as realized by the skilled person, but which are not shown herein for the sake of simplifying.

Figure 3:
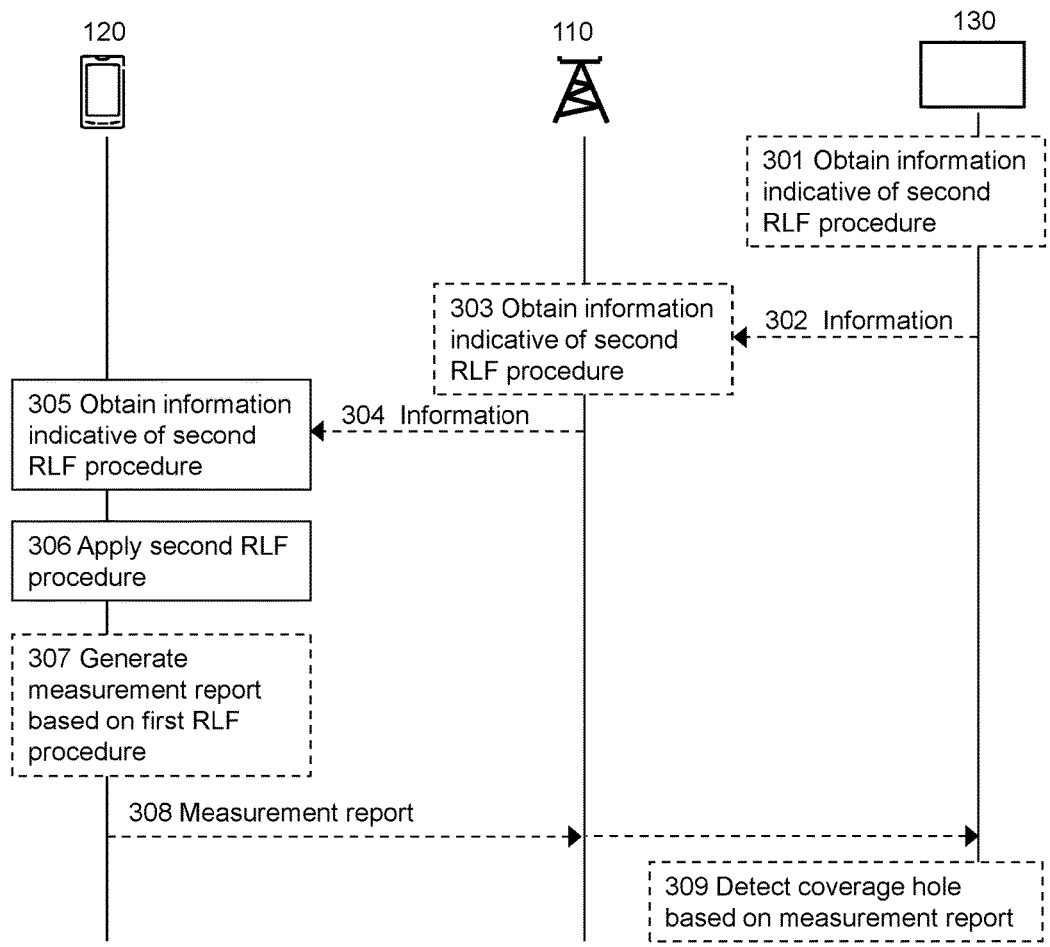
FIG. 3 is a combined signaling diagram and flowchart for describing embodiments herein.

FIG. 3 depicts a combined signaling diagram and flowchart and will be used to discuss examples of embodiments of a method, and related examples, for managing Radio Link Failures (RLF) of the wireless device 120. Other failures that relate to and may be caused by RLF, e.g. HandOver Failures (HOF), may be affected as well. A first, default, RLF procedure is associated with at least a first type of wireless devices supported by the wireless communication network 100. As mentioned above, the wireless device 120 is of a second type having an improved radio coverage capability compared to the first type. As used herein, by RLF procedure is meant a procedure for concluding that a wireless device is considered to be in a state of RLF, e.g. resulting from that the wireless device is located in a so called coverage hole, e.g. the coverage hole 116. In other words, a RLF procedure may refer to a procedure used for identifying radio link failures, i.e. a radio link that has failed or at least provides so bad performance that it is considered to have failed. As should be recognized by the skilled person, a RLF procedure is typically defined by rule(s) and/or parameter(s). The improved radio coverage capability means that a wireless device of the second type, such as the wireless device 120, will not experience problematic coverage, e.g. a coverage hole, where a wireless device of the first type would.

It is typically known in advance by wireless devices of the second type, e.g. the wireless device 120, and/or by the wireless communication network 100 that these wireless devices are of the second type and thereby at least capable of improved radio coverage. For example, the wireless device 120 may have been initially encoded with information that is of the second type and/or it may have performed an internal check to get this knowledge. The wireless communication network 100, e.g. one or more network nodes therein, such as the core network node 130, may have got information that the wireless device 120 is of the second type from the wireless device 120 when it registered and/or connected with the wireless communication network 100, or in response to requesting the wireless device 120 about this information and/or that the wireless communication network 100 have performed some check to get this information.

The method comprises the following actions, which actions may be taken in any suitable order and/or be carried out fully or partly overlapping in time when this is possible and suitable.

Action 301

The core network node 130 may obtain information indicative of or relating to the second RLF procedure, which information is based on that the wireless device 120 is of the second type with improved radio coverage capability, i.e. based on knowledge about the wireless device 120 and that the wireless device 120 is of the second type. Such knowledge may origin from the wireless device 120 itself as explained above. The obtained information may at least party be input by an operator of the wireless communication network 100, e.g. the operator may determine to configure wireless devices of the second type to apply the second RLF procedure and/or details about how the second RLF procedure shall be configured. Examples of the obtained information are discussed below.

Action 302

The core network node 130 may send the information it obtained in Action 301 to the base station 110 and/or to the wireless device 120 via the base station 110. The base station 110 and/or to the wireless device 120 may thus receive the information that was obtained by the core network node 130.

Action 303

The base station 110 may obtain information indicative of the second RLF procedure, which information is based on that the wireless device 120 is of the second type with improved radio coverage capability. The base station 110 may receive at least part of the information it obtains from the core network node 130. Examples of the obtained information are discussed below.

Action 304

The base station 110 may send the information it obtained in Action 303 to the wireless device 120. The wireless device 120 thus receives the information that was obtained by the base station 110.

Action 305

The wireless device 120 obtains information indicative of the second RLF procedure, which information is based on that the wireless device 120 is of said second type with improved radio coverage capability compared to the first type. The obtained information may at least partly be received from the core network node 130 and/or the base station 110, as discussed above.

The obtained information may comprise one or more configuration parameters that configures the wireless device 120 to apply the second RLF procedure. The configuration parameters will be exemplified separately below.

Note that it may not always be enough that the wireless device 120 is capable of using some feature, e.g. beamforming, but it may also need to be made to actually use it, e.g. with support from the wireless communication network 100. For example, if the wireless device 120 is capable of improved radio coverage due to beamforming, the wireless communication network 100 must apparently also support and use beamforming in order to utilize this.

Action 306

The wireless device 120 applies, based on and/or in response to the obtained information, said second RLF procedure. The second RLF procedure will be explained in some detail separately below.

The wireless device 120 may apply the second RLF procedure, and/or the information in Action 305 may be obtained based on that the wireless device 120 is triggering on an event, e.g. that serving cell Reference Signal Received Quality (RSRQ) or Reference Signal Received Power (RSRP), e.g. for the cell 115, drops below a predefined and/or predetermined level. Other conditions may also apply additionally or alternatively, i.e. separately or jointly, and e.g. be based on an estimated experienced beamforming gain for the wireless device 120.

Action 307

The wireless device 120 may generate a measurement report based on the first RLF procedure. The measurement report relating to measurements according to the first RLF procedure for determining when the wireless device 120 is considered to be in the state of RLF.

Action 308

The wireless device 120 may send the measurement report generated in Action 307 to the base station 110 and/or the core network node 130, which receives it. The measurement report is sent via the base station 110 when it is sent to the core network node 130.

Action 309

The core network node 130 may detect a coverage hole, e.g. the coverage hole 116, based on the received measurement report.

Embodiments herein, through introduction and application of the second RLF procedure, enables wireless devices, such as the wireless device 120 of the second type, with improved radio coverage capability compared to other wireless devices of the first type, to function and not be considered to be in a state of RLF when located in a coverage hole, e.g. the coverage hole 116, for wireless devices of the first type. Hence, embodiments herein enables avoidance of such interruption and signaling caused by unnecessary radio link failure as discussed above and thereby provide improvement with regard to how RLFs are being managed.

Additionally, embodiments herein enable detection of coverage hole, which can be automated, by use of wireless devices, such as the wireless device 120 of the second type, with improved radio coverage capability and applying the second RLF procedure. By additionally configuring such wireless devices, through the obtained information and based on the first RLF procedure, to generate said measurement report, the measurement report can be used to detect coverage holes. The coverage holes may be characterized, e.g. regarding size and location, if the detection is combined with positioning of wireless devices when generating measurement reports. By performing such generation of measurement reports over time, during mobility and/or from multiple wireless devices, better data and knowledge of coverage holes can be obtained.

More detailed examples and further discussion regarding embodiments herein follow below.

In some embodiments herein, the first and second RLF procedures apply first and second time periods, respectively, from when the wireless device 120 is considered to be out-of-sync until the wireless device 120 is considered to be in a state of RLF. The second time period being longer than the first time period. As realized from the Background, a wireless device, e.g. the wireless device 120, being out-of-sync, or out of synchronization with regard to a connection the wireless device 120 should have to the wireless communication network 100, may be considered as an indication that there may be a RLF. Determining that a wireless device. e.g. the wireless device 120, is out-of-sync is typically based on measurements. A certain number of such measurements consecutively indicating out-of-sync may determine that there is a RLF.

In these embodiments, the obtained information in Action 305 may comprise one or more configuration parameters that configure the wireless device 120 to apply the second time period. Also, the obtained information in Action 301 and/or 302, may comprise all or some of these configuration parameters. For example, such in the case of LTE, in some embodiments the wireless device 120, through the obtained information, is configured with longer one or more RLF-timers and/or constants, such as T310 and/or N310 as mentioned in the Background, and/or reduced in-sync constants, e.g. N311 as mentioned in the Background. This way embodiments herein may be implemented without actually having to change anything in existing standards such as those mentioned in the Background.

In some embodiments, explicit signaling may be used to reset or stop a RLF timer, e.g. by using Radio Resource Control (RRC), Medium Access Control (MAC) or physical layer signaling. Compared to using and setting already existing timers and constants, this, i.e. use of explicit reset and/or stop messages, may require change in existing standards. The explicit signaling may be based on an already existing message, such as a timing advance command or any correctly decoded downlink transmission.

Further, in some embodiments herein, the first and second RLF procedures apply first and second thresholds, respectively, for determining when the wireless device 120 is considered to be out-of-sync. The second threshold allowing for worse conditions than the first threshold before determining that the wireless device 120 is considered to be out-of-sync. Thereby the wireless device is enabled to not be considered to be in a state of RLF although a wireless device of the first type would. In this case the obtained information may comprise one or more configuration parameters that configure the wireless device 120 to apply the second threshold. For example, such in the case of LTE, in some embodiments herein, the wireless device 120 through the obtained information is configured with a different threshold for when to indicate out-of-sync, e.g. based on a different targeted error rate on PDCCH. The target error rate may e.g. be 50% instead of 10% or based on a signal power offset, e.g. a number of dB dependent on an expected beamforming gain.

Moreover, in some embodiments herein, the second RLF procedure is based on measurements on a different reference signal than the first RLF procedure. In this case the obtained information may comprise an identifier that identifies said different reference signal. For example, in some embodiments herein, the wireless device 120 is, through the obtained information, configured to measure RLF on Channel-State Information Reference Signals (CSI-RS) and/or on an effective Signal to Interference and Noise Ratio (SINR) that may be based on expected SINR using a reported pre-coder matrix. A separate, e.g. new, signal may be used for radio link monitoring.

Note that the first RLF procedure and the second RLF procedure are two different procedures that may be more or less independent. Each may be associated with its own set of configuring parameters, e.g. with regard to timers, thresholds and reference signals as discussed above. For example, the first RLF procedure may be associated with a timer having a first value and the second RLF procedure may be associated with a same or different timer having another, or same, second timer value. Some configuring parameters may be the same while other may differ, e.g. timer values may be independent from each other and/or the same, while e.g. thresholds differ. For example, a threshold value setting a threshold for the second RLF procedure may be chosen so the threshold become higher than a corresponding threshold according to the first RLF procedure.

The measurement report and coverage hole detection in Actions 307-309 will now be further discussed. The wireless device 120 with improved coverage may thus, through the obtained information, e.g. be configured to generate and send the measurement report at a point when and where the wireless device 120 enters a RLF condition in the CRS beam had it been configured with similar RLF measurement and timer characteristics to that of a wireless device without improved coverage and when there is no other cell with a better CRS beam received power available. Basically, when the wireless device 120 perceives a currently serving cell, e.g. the cell 115, to be having the strongest CRS beam compared to other cells and is considered to be in a state of RLF according to the first RLF procedure, then the UE may "trigger" generation of the measurement in Action 307 and sending it as in Action 308. The report being generated and sent may thus indicate detection of the coverage hole 116.

In some embodiments, wireless devices of the second type, e.g. the wireless device 120, have the improved coverage compared to other wireless devices, e.g. of the first type, owing to beamforming, and/or due to better receiver implementation.

In some embodiments, the wireless device 120 determine based on estimation whether or not the wireless device 120 is considered to be in the state of RLF according to the first RLF procedure. The estimation may be based on a worse receiver condition, e.g. as if the wireless device 120 would have fewer number of receive antennas or lower interference suppression capabilities. The worsening differences may for example be based on different one or more categories and/or capabilities of wireless devices. For example, the wireless device 120 may be configured, e.g. through the obtained information, to be considered to be in a state of, and/or report, RLF according to the first RLF procedure based on that the wireless devise 120 for this purpose is associated with, e.g. assumed to belong to, a "lower" such category and/or not having a certain capability. The lower category and/or the missing certain capability may be such that are associated with wireless devices of the first type.

Figure 4:
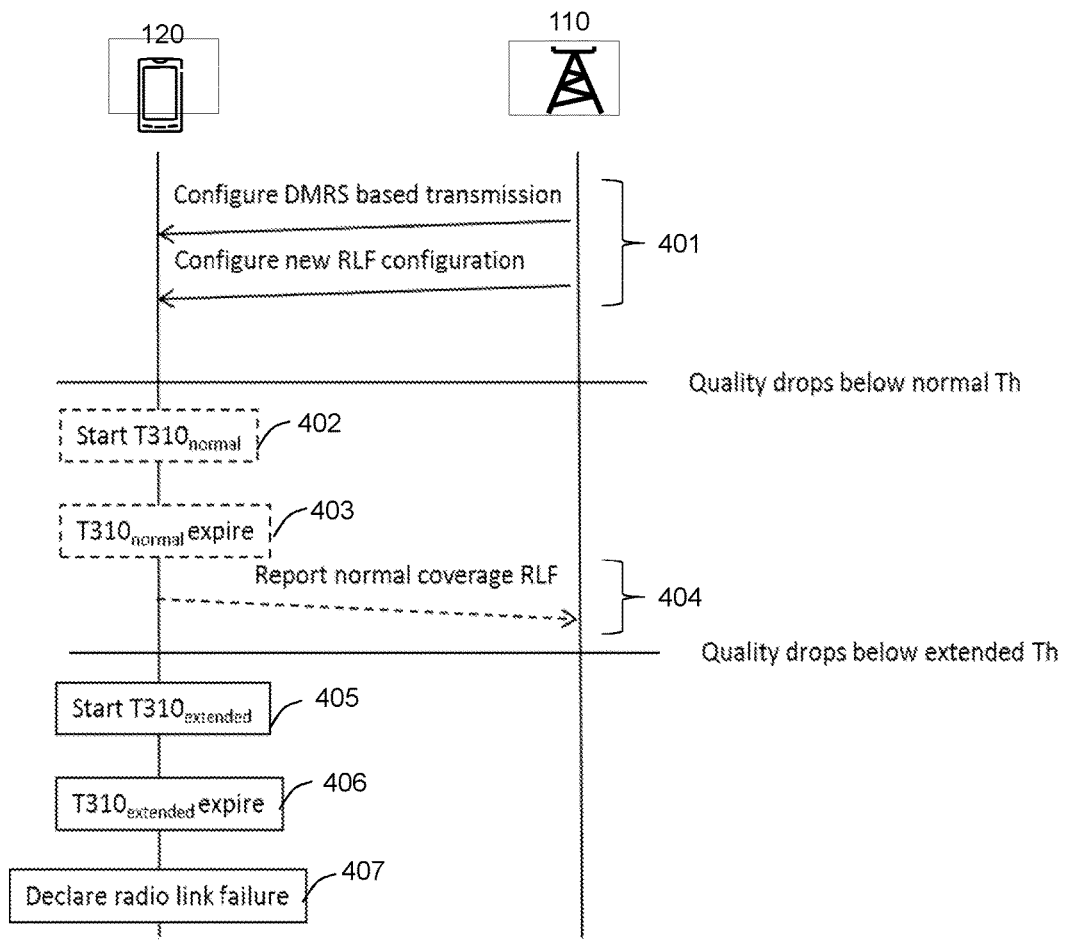
FIG. 4 is a combined signaling diagram and flowchart for exemplifying embodiments herein in some further detail.

Hence, a first, or main, part of embodiments herein relates mainly to how unnecessary RLF can be avoided for wireless devices of a second type that have improved radio coverage capability compared to wireless devices of a first type. A second part of embodiments herein relates to how wireless devices of the second type then can be used for detecting coverage holes, e.g. in a CRS coverage pattern. Both these parts will now be described in some further detail with reference to FIG. 4 with some details that are specific for LTE. FIG. 4 is a combined signaling diagram and flowchart, thus for describing embodiments herein in some further detail.

First in an action 401, the wireless communication network 100, via the base station 110, configures the wireless device 120 for Demodulation Reference Signals (DMRS) based transmission and/or a different, new RLF configuration. This makes the wireless device 120 implement embodiments herein. Action 401 fully or partly correspond to Actions 301-306 above.

Figure 1:
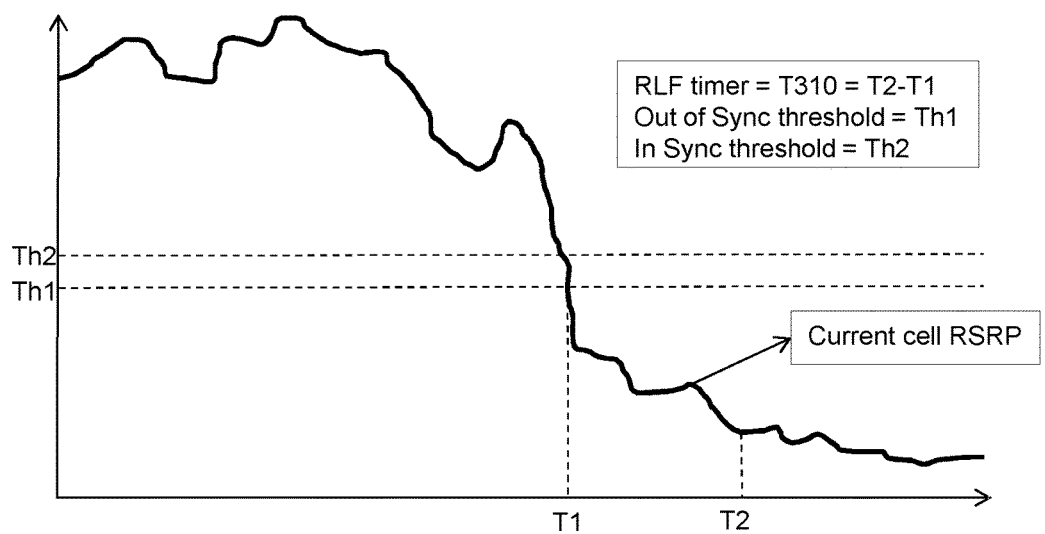
FIG. 1 is an example diagram showing how Reference Signal Received Power (RSRP) can change over time for a wireless device moving into a coverage hole in the network.

As a result from the configuration of the wireless device 120, unnecessary RLF can be avoided by a wireless device of the second type, such as the wireless device 120, by one or more of the following:

Application of a longer RLF timer T310, i.e. the timer involved in actions 405-406. With reference to FIG. 1, this may be considered equivalent to pushing the time T2 to a later point in time by having larger values of T310.

Application of a larger value of N310. By increasing the number of consecutive out-of-sync measurements to start the T310 timer in action 405, the occurrence of RLF may be delayed and/or avoided when it is unnecessary and/or undesirable, such as not needed with RLF for a wireless devices of the second type. With reference to FIG. 1, this may be considered equivalent to pushing the time T1 to a later point in time, i.e. to the right along the time axis in FIG. 1.

Application of different out-of-sync threshold(s). With reference to FIG. 1, this may correspond to lowering the value of Th1.

Controlling the RLF timer(s), e.g. involving stopping a RLF time.

Using a different reference signal, e.g. CSI-RS, for RLF measurements. This may correspond to having RLF related measurements be performed on a CSI-RS rather than on CRS.

Additionally, as a result from the configuration of the wireless device 120, the wireless device may be configured for, or at least to support, coverage hole detection. That is, in the presence of wireless devices of the second type, such as the wireless device 120, the wireless communication network 100, e.g. for some or all cells thereof, such as the cell 115, can use one or more such wireless devices, e.g. the wireless device 120, to detect coverage holes where the wireless communication network 100 and cells thereof actually should provide radio coverage. For example, the wireless device 120 may be additionally configured to at least partly apply RLF criteria and timers as it would conventionally, e.g. as if the wireless device 120 would be of the first type. This is illustrated by actions 402-404 in FIG. 4. Action 403 comprises expiration of the conventional, or normal, T310 timer, as used for wireless devices of the first type and also comprises generation of a measurement report that may be generated according to, and/or in response to application of, a conventional, or normal, RLF procedure, corresponding to the RLF procedure named first RLF procedure above. Actions 403-404 may thus fully or partly correspond to Actions 307-308 above. In other words, the wireless device 120 may be configured to trigger generation of a measurement report when one or more RLF criteria, associated with wireless devices of the first type, are fulfilled, e.g. as if the wireless device 120 was of the first type, e.g. a legacy wireless device, not having the improved radio coverage capability, i.e. extended coverage, although actually has this capability.

It is realized that actions 402-404 occur before actions 405-407 discussed above since the idea with the latter actions are that actual RLF shall not be generated when it would be generated for a wireless device of the first type.

Hence, configuration of the wireless device 120 may involve setting two or more values, such as one or more for actual RLF and one or more for coverage hole detection. The the former values may correspond to values of configuration parameters of the second RLF procedure and the latter values may correspond to values of configuration parameters of the first RLF procedure. The values may relate to one or more of the following timers and constants:

The T310 timer, which e.g. may be set to a value T310_extended regarding RLF and a value T310_normal for coverage hole detection purpose.

The N310, which e.g. may be set to a value N310_extended regarding RLF and a value N310_normal for coverage hole detection purpose.

The out-of-Sync threshold, which e.g. may be set to a value Th1_extended regarding RLF and a value Th1_normal for coverage hole detection purpose.

After the wireless device 120, e.g. according to action 305 or action 401, has obtained information that configures it, for example with regard to the above timers and constants, the result may be that the wireless device 120 thereby generates RLF only when RLF criteria based on the values associated with the improved radio coverage capability, i.e. extended coverage, are fulfilled. Or in other words, the second RLF procedure may be used to generate actual RLF. The wireless device may additionally generate a measurement report for coverage hole detection when criteria based on the values associated with a conventional, or normal, RLF procedure are fulfilled. Or in other words, the first RLF procedure may be used to generate the measurement report for coverage hole detection. Generation of the measurement report and/or sending it to the wireless communication network 100 may thus happen when wireless devices of the second type, e.g. the wireless device 120, fulfill normal coverage criterions for RLF, such as for wireless devices of the first type, and when the current serving cell's, e.g. cell 115, CRS still has the highest received power amongst other neighbouring cells' CRS values. This may be used to ensure that the cause for RLF is not due to delayed handover. When the wireless communication network, e.g. a network node thereof such as the core network node 130, receives the measurement report, an involved cell, e.g. cell 115, can be identified as comprising a coverage hole, e.g. the coverage hole 116 with regard to CRS beam coverage for wireless devices of the first type, such as legacy wireless devices. A coverage hole can thereby be detected in a more automated way than e.g. based on drive test. Hence, improvement is enabled that can be used to at least reduce the need for drive test measurements and also for other Self Organizing Network (SON) functions for optimizing coverage of a cell.

Hence, embodiments herein may be implemented so that multiple parameters related to RLF triggering is configured differently for a wireless device of the second type, such as the wireless device 120, e.g. that supports different beamforming solutions, e.g. that is configured with a DMRS based transmission mode and/or Enhanced Physical Downlink Control CHannel (EPDCCH). For example, when such wireless device approaches a known coverage hole on the CRS, it may be configured with a significantly longer RLF timer in case beam forming is possible to thereby extended the data and control coverage into the coverage hole.

Additionally, as explained above, such wireless devices, e.g. the wireless device 120, may be configured to trigger a measurement and measurement report if e.g. a second timer triggers. The second timer may be a RLF-timer used by less capable wireless devices, such as of the first type, thereby allowing efficient "coverage hole" detection, i.e. detection of coverage holes for the less capable wireless devices.

Figure 5:
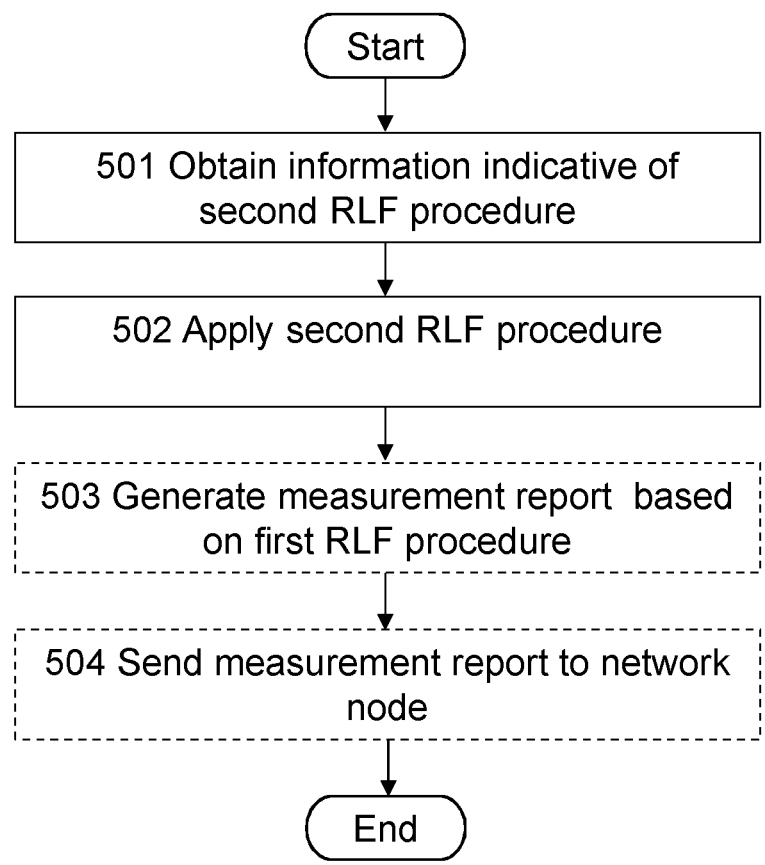
FIG. 5 is a flowchart schematically illustrating embodiments of a method performed in a wireless device.

FIG. 5 is a flow chart schematically illustrating embodiments of a method, performed by a wireless device, e.g. the wireless device 120, for managing RLF when the wireless device 120 is served by a wireless communication network, e.g. the wireless communication network 100. As mentioned above, a first, default, RLF procedure is associated with at least a first type of wireless devices supported by the wireless communication network 100.

The method comprises the following actions, which actions may be taken in any suitable order and/or be carried out fully or partly overlapping in time when this is possible and suitable.

Action 501

The wireless device 120 obtaining obtains information indicative of a second RLF procedure based on that the wireless device 120 is of a second type having an improved radio coverage capability compared to the first type.

In some embodiments, the obtained information is at least partly received from a network node, e.g. the base station 110 or the core network 130, comprised in the wireless communication network 100.

The obtained information may comprise one or more configuration parameters that configures the wireless device 120 to apply the second RLF procedure.

In some embodiments, the first and second RLF procedures apply first and second time periods, respectively, from when the wireless device 120 is considered to be out-of-sync until the wireless device 120 is considered to be in a state of RLF. The second time period being longer than the first time period.

Further, in some embodiments, the first and second RLF procedures apply first and second thresholds, respectively, for determining when the wireless device 120 is considered to be out-of-sync. The second threshold allowing for worse conditions than the first threshold before the wireless device 120 is considered to be out-of-sync.

Moreover, in some embodiments, the second RLF procedure is based on measurements on a different reference signal than the first RLF procedure.

This action may fully or partly correspond to Action 305 above.

Action 502

The wireless device 120 applies, based on the obtained information, said second RLF procedure.

the first and second RLF procedures apply first and second time periods, respectively, from when the wireless device (120) is considered to be out-of-sync until the wireless device (120) is considered to be in a state of RLF, which second time period is longer than the first time period.

This action may fully or partly correspond to Action 306 above.

Action 503

The wireless device 120 may generate a measurement report based on the first RLF procedure. The measurement report relating to measurements according to the first RLF procedure for determining when the wireless device 120 is considered to be in the state of RLF.

This action may fully or partly correspond to Action 307 above.

Action 504

The wireless device 120 may send the measurement report to a core network node, e.g. the core network node 130, comprised in the wireless communication network 100.

This action may fully or partly correspond to Action 308 above.

Figure 6:
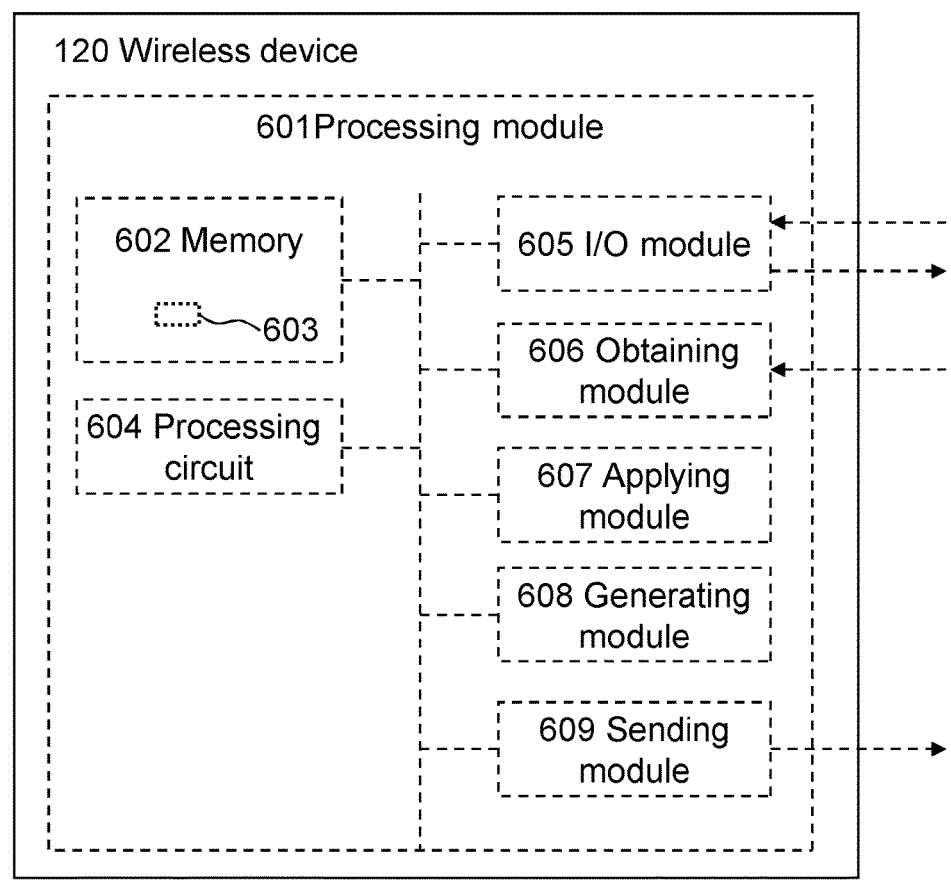
FIG. 6 is a functional block diagram for illustrating embodiments of the wireless device.

FIG. 6 is a schematic block diagram for illustrating embodiments of the wireless device 120 mentioned above in connection with FIG. 5, for managing RLF of the wireless device 120, in particular how the wireless device 120 may be configured to perform the method and actions discussed above in connection with FIG. 5.

The wireless device 120 may comprise a processing module 601, such as a means, one or more hardware modules, including e.g. one or more processors, and/or one or more software modules for performing said methods and/or actions.

The wireless device 120 may further comprise a memory 602 that may comprise, such as contain or store, a computer program 603. The computer program 603 comprises 'instructions' or 'code' directly or indirectly executable by the wireless device 120 so that it performs the said methods and/or actions. The memory 602 may comprise one or more memory units and may be further be arranged to store data, such as configurations and/or applications involved in or for performing functions and actions of embodiments herein.

Moreover, the wireless device 120 may comprise a processing circuit 604 as an exemplifying hardware module and may comprise or correspond to one or more processors. In some embodiments, the processing module 601 may comprise, e.g. 'is embodied in the form of' or 'realized by' the processing circuit 704. In these embodiments, the memory 602 may comprise the computer program 603 executable by the processing circuit 604, whereby the wireless device 120 is operative, or configured, to perform said method and/or actions.

Typically the wireless device 120, e.g. the processing module 601, comprises an Input/Output (I/O) module 605, configured to be involved in, e.g. by performing, any communication to and/or from other units and/or nodes, such as sending and/or receiving information to and/or from other external nodes or devices. The I/O module 605 may be exemplified by an obtaining, e.g. receiving, module and/or a providing, e.g. sending, module, when applicable.

In further embodiments, the wireless device 120, e.g. the processing module 601, may comprise one or more of an obtaining module 606, an applying module 607, a generating module 608 and a sending module 609 as exemplifying hardware and/or software module(s). In some embodiments, the obtaining module 606, the applying module 607, the generating module 608 and the sending module 609 may be fully or partly implemented by the processing circuit 604.

Therefore, according to the various embodiments described above, the wireless device 120, and/or the processing module 601 and/or the obtaining module 606 are operative, or configured, to, obtain said information indicative of the second RLF procedure based on that the wireless device 120 is of the second type having an improved radio coverage capability compared to the first type.

Moreover, according to the various embodiments described above, the wireless device 120, and/or the processing module 601 and/or the applying module 607 may be operative, or configured, to apply, based on the obtained information, said second RLF procedure.

In some embodiments, the wireless device 120, and/or the processing module 601 and/or the generating module 608 are further operative, or configured to generate said measurement report based on the first RLF procedure. As mentioned above, the measurement report relates to measurements according to the first RLF procedure for determining when the wireless device 120 is considered to be in the state of RLF.

Further, according to the various embodiments described above, the wireless device 120, and/or the processing module 601 and/or the sending module 609 are operative, or configured, to send the measurement report to said core network node 130, comprised in the wireless communication network 100.

Figure 7:
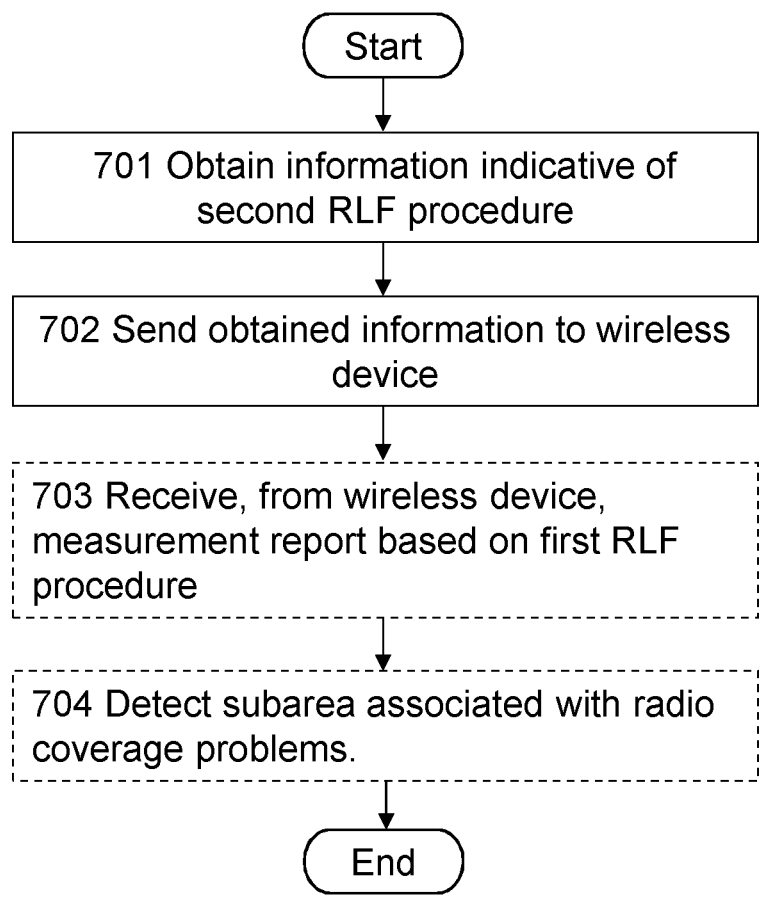
FIG. 7 is a flowchart schematically illustrating embodiments of a method performed in a network node.

FIG. 7 is a flow chart schematically illustrating embodiments of a method, performed by a network node, e.g. any one of the base station 110 and core network node 130, for supporting a wireless device, e.g. the wireless device 120, to manage RLF when the wireless device 120 is served by a wireless communication network 100. In the following, the network node will for the sake of simplicity be numbered as in FIG. 8 discussed below, i.e. as a network node 800 that may refer to any one of the base station 110, the core network node 130 and any other network node. The network node 800 is thus comprised in the wireless communication network 100. As mentioned above, a first, default, RLF procedure is associated with at least a first type of wireless devices supported by the wireless communication network 100.

The method comprises the following actions, which actions may be taken in any suitable order and/or be carried out fully or partly overlapping in time when this is possible and suitable.

Action 701

The network node 800 obtains information indicative of a second RLF procedure based on that the wireless device 120 is of a second type having an improved radio coverage capability compared to the first type.

This action may fully or partly correspond to any one of Actions 301, 303 above.

Action 702

The network node 800 sends the obtained information to the wireless device 120.

The obtained information may comprises one or more configuration parameters for configuring the wireless device 120 to apply the second RLF procedure.

In some embodiments, the first and second RLF procedures apply first and second time periods, respectively, from when the wireless device 120 is considered to be out-of-sync until the wireless device 120 is considered to be in a state of RLF. The second time period being longer than the first time period.

Further, in some embodiments, the first and second RLF procedures apply first and second thresholds, respectively, for determining when the wireless device 120 is considered to be out-of-sync. The second threshold allowing for worse conditions than the first threshold before the wireless device 120 is considered to be out-of-sync.

Moreover, in some embodiments, the second RLF procedure is based on measurements on a different reference signal than the first RLF procedure.

This action may fully or partly correspond to any one of Actions 302, 304 above.

Action 703

The network node 800 may receive, from the wireless device 120, a measurement report. The measurement report has been generated by the wireless device 120 based on the first RLF procedure. The measurement report relates to measurements according to the first RLF procedure for determining when the wireless device (120) is considered to be in the state of RLF.

This action may fully or partly correspond to Action 308 above.

Action 704

The network node 800 may detect, based on the received measurement report, a subarea, such as the coverage hole 116, associated with radio coverage problems. This action may fully or partly correspond to Action 309 above.

Figure 8:
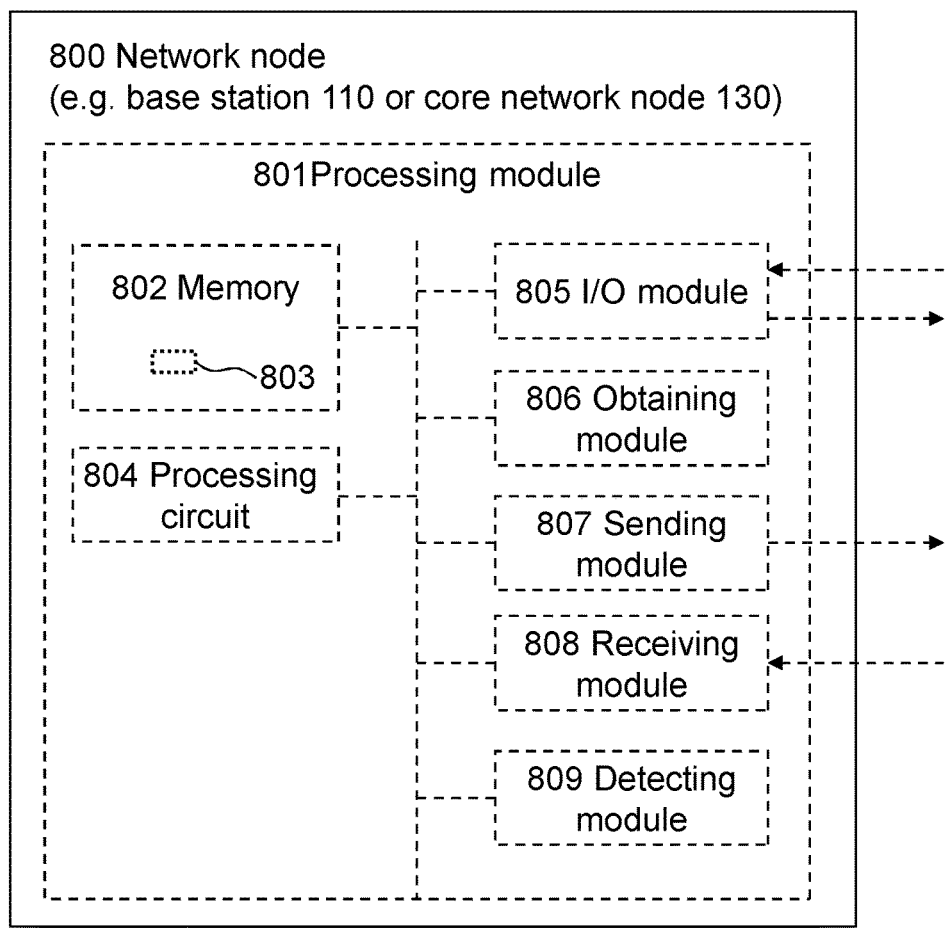
FIG. 8 is a functional block diagram for illustrating embodiments of the network node.

FIG. 8 is a schematic block diagram for illustrating embodiments of a network node 800, e.g. the base station 110 or the core network node 130, as already mentioned above in connection with FIG. 7. The network node 800 is thus for supporting a wireless device, e.g. the wireless device 120, to manage RLF when the wireless device 120 is served by a wireless communication network 100, in particular how the network node 800, in addition to be configured to be comprised in the first wireless communication network 100, may be configured to perform the method and actions discussed above in connection with FIG. 7.

The network node 800 may comprise a processing module 801, such as a means, one or more hardware modules, including e.g. one or more processors, and/or one or more software modules for performing said methods and/or actions.

The network node 800 may further comprise a memory 802 that may comprise, such as contain or store, a computer program 803. The computer program comprises 'instructions' or 'code' directly or indirectly executable by the network node 800 so that it performs the said methods and/or actions. The memory 802 may comprise one or more memory units and may be further be arranged to store data, such as configurations and/or applications involved in or for performing functions and actions of embodiments herein.

Moreover, the network node 800 may comprise a processing circuit 804 as an exemplifying hardware module and may comprise or correspond to one or more processors. In some embodiments, the processing module 801 may comprise, e.g. 'is embodied in the form of' or 'realized by' the processing circuit 804. In these embodiments, the memory 802 may comprise the computer program 803 executable by the processing circuit 804, whereby the network node 800 is operative, or configured, to perform said method and/or actions.

Typically the network node 800, e.g. the processing module 801, comprises an Input/Output (I/O) module 805, configured to be involved in, e.g. by performing, any communication to and/or from other units and/or nodes, such as sending and/or receiving information to and/or from other external nodes or devices. The I/O module 805 may be exemplified by an obtaining, e.g. receiving, module and/or a providing, e.g. sending, module, when applicable.

In further embodiments, the network node 800, e.g. the processing module 801, may comprise one or more of an obtaining module 806, a sending module 807, a receiving module 808 and a detecting module 809, as exemplifying hardware and/or software module(s). In some embodiments, the obtaining module 806, the sending module 807, the receiving module and the detecting module 809 may be fully or partly implemented by the processing circuit 804.

Therefore, according to the various embodiments described above, the network node 800, and/or the processing module 801 and/or the obtaining module 806 are operative, or configured, to obtain information indicative of a second RLF procedure based on that the wireless device 120 is of said second type having an improved radio coverage capability compared to the first type.

Moreover, according to the various embodiments described above, the network node 800, and/or the processing module 801 and/or the sending module 807 are operative, or configured, to send the obtained information to the wireless device 120.

Further, according to the various embodiments described above, the network node 800, and/or the processing module 801 and/or the receiving module 807 may be operative, or configured, to receive, from the wireless device 120, said measurement report that has been generated by the wireless device 120 based on the first RLF procedure. As mentioned above, the measurement report relates to measurements according to the first RLF procedure for determining when the wireless device 120 is considered to be in the state of RLF.

Also, according to the various embodiments described above, the network node 800, and/or the processing module 801 and/or the detecting module 809 may be operative, or configured, to detect, based on the received measurement report, a subarea, such as the coverage hole 116, associated with radio coverage problems.

Figure 9A:
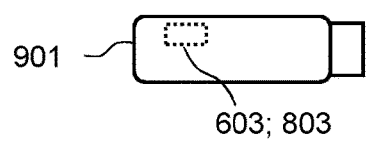
FIGS. 9a-c are schematic drawings illustrating embodiments relating to computer program products and computer programs to cause the source radio network node, the wireless device and the target radio network node to perform method actions.
Figure 9B:
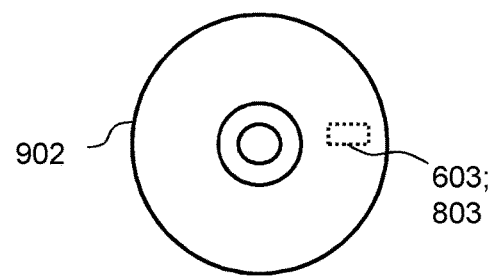
Figure 9C:
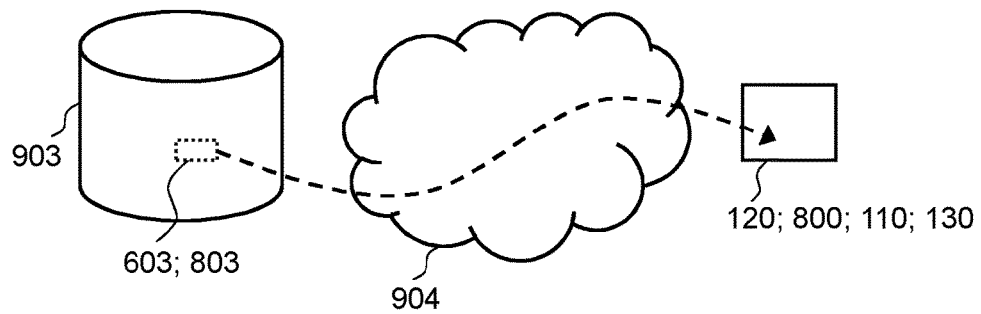

FIGS. 9*a-c* are schematic drawings illustrating embodiments relating to a computer program that may be any one of the computer programs 603, 803 and that comprises instructions that when executed by the processing circuits 604, 804, respectively and/or the processing modules 601, 801 respectively, causes the wireless device 120 and/or the network node 800, e.g. the baste station 110 or core network node 130, to perform as described above.

In some embodiments there is provided a data carrier, e.g. a computer program product, comprising any one or both of the computer programs 603, 803. The data carrier may be one of an electronic signal, an optical signal, a radio signal, and a computer readable medium. Any one, some or all of the computer programs 603, 803 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 901 as in FIG. 9*a*, a disc storage medium 902 such as a CD or DVD as in FIG. 9*b*, a mass storage device 903 as in FIG. 9*c*. The mass storage device 903 is typically based on hard drive(s) or Solid State Drive(s) (SSD). The mass storage device 903 may be such that is used for storing data accessible over a computer network 904, e.g. the Internet or a Local Area Network (LAN).

Any one, some or all of the computer programs 603, 803 may furthermore be provided as a pure computer program or comprised in a file or files. The file or files may be stored on the computer-readable medium and e.g. available through download e.g. over the computer network 904, such as from the mass storage device 903 via a server. The server may e.g. be a web or File Transfer Protocol (FTP) server. The file or files may e.g. be executable files for direct or indirect download to and execution on the wireless communication device 120 and/or the network node 800, e.g. by any one or both of the processing circuits 604, 804. The file or files may also or alternatively be for intermediate download and compilation involving the same or another processor to make them executable before further download and execution causing the wireless device 120 and/or the network node 800 to perform the method(s) as described above.

Note that any processing module(s) mentioned in the foregoing may be implemented as a software and/or hardware module, e.g. in existing hardware and/or as an Application Specific integrated Circuit (ASIC), a Field-Programmable Gate Array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the wireless device 120 and/or the network node 800 to be configured to and/or to perform the above-described methods, respectively.

Many details of examples above relate to LTE, i.e. are in a particular RAT context, and/or may have a specific meaning in such context, as recognized by the skilled person. However, embodiments herein are not limited to only such context(s) as used in the examples. For example, RLF mentioned herein does not have to be LTE-specific.

The term "network node" as used herein may as such refer to any type of radio network node (described below) or any network node, which may communicate with at least a radio network node. Examples of such network nodes include any radio network node stated above, a core network node (e.g. MSC, MME, etc.), Operations & Maintenance (O&M), Operations Support Systems (OSS), Self Organizing Network (SON) node, positioning node (e.g. E-SMLC), MDT etc.

The term "radio network node" as used herein may as such refer to any type of network node capable of serving a wireless device, e.g. UE, and/or that are connected to other network node(s) or network element(s) or any radio node from which a wireless device receives signals. A radio network is typically comprised in a Radio Access Network (RAN) part of a wireless communication network. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, nodes in distributed antenna system (DAS) etc.

The term "node" as used herein may be used for the sake of simplicity, in order to denote a node which may be a network node, a radio network node or a wireless device, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a wireless device, for managing radio link failures, "RLF", of the wireless device when the wireless device is served by a wireless communication network, a first, default, RLF procedure being associated with at least a first type of wireless devices supported by the wireless communication network, wherein the method comprises:

obtaining information indicative of a second RLF procedure based on that the wireless device is of a second type having an improved radio coverage capability compared to the first type, wherein the second RLF procedure is based on measurements on a different reference signal than the first RLF procedure;

applying, based on the obtained information, said second RLF procedure, wherein the first and second RLF procedures apply first and second time periods, respectively, from when the wireless device is considered to be out-of-sync until the wireless device is considered to be in a state of RLF, which second time period is longer than the first time period; and generating a measurement report based on the first RLF procedure, which measurement report relates to measurements according to the first RLF procedure for determining when the wireless device is considered to be in the state of RLF.

2. The method as claimed in claim 1, wherein the obtained information is at least partly received from a network node comprised in the wireless communication network.

3. The method as claimed in claim 1, wherein the obtained information comprise one or more configuration parameters that configures the wireless device to apply the second RLF procedure.

4. The method as claimed in claim 1, wherein the first and second RLF procedures apply first and second thresholds, respectively, for determining when the wireless device is considered to be out-of-sync, which second threshold allows for worse conditions than the first threshold before the wireless device is considered to be out-of-sync.

5. The method as claimed in claim 1, wherein the method further comprises: sending the measurement report to a core network node comprised in the wireless communication network.

6. A method, performed by a network node, for supporting a wireless device to manage radio link failures, "RLF", when the wireless device is served by a wireless communication network, the network node being comprised in the wireless communication network, a first, default, RLF procedure being associated with at least a first type of wireless devices supported by the wireless communication network, wherein the method comprises:

obtaining information indicative of a second RLF procedure based on that the wireless device is of a second type having an improved radio coverage capability compared to the first type, wherein the second RLF procedure is based on measurements on a different reference signal than the first RLF procedure;

sending the obtained information to the wireless device, wherein the first and second RLF procedures apply first and second time periods, respectively, from when the wireless device is considered to be out-of-sync until the wireless device is considered to be in a state of RLF, which second time period is longer than the first time period; and receiving, from the wireless device, a measurement report, which measurement report has been generated by the wireless device based on the first RLF procedure, which measurement report relates to measurements according to the first RLF procedure for determining when the wireless device is considered to be in the state of RLF.

7. The method as claimed in claim 6, wherein the obtained information comprises one or more configuration parameters for configuring the wireless device to apply the second RLF procedure.

8. The method as claimed in claim 6, wherein the first and second RLF procedures apply first and second thresholds, respectively, for determining when the wireless device is considered to be out-of-sync, which second threshold allows for worse conditions than the first threshold before the wireless device is considered to be out-of-sync, wherein the obtained information configures the wireless device to apply the second threshold.

9. The method as claimed in claim 6, wherein the first and second RLF procedures apply first and second time periods, respectively, from when the wireless device is considered to be out-of-sync until the wireless device is considered to be in a state of RLF, which second time period is longer than the first time period.

10. The method as claimed in claim 9, wherein the method further comprises:
detecting, based on the received measurement report, a subarea associated with radio coverage problems.

11. A wireless device for managing radio link failures, "RLF", of the wireless device when the wireless device is served by a wireless communication network, a first, default, RLF procedure being associated with at least a first type of wireless devices supported by the wireless communication network, wherein the wireless device is configured to:
obtain information indicative of a second RLF procedure based on that the wireless device is of a second type having an improved radio coverage capability compared to the first type, wherein the second RLF procedure is based on measurements on a different reference signal than the first RLF procedure;
apply, based on the obtained information, said second RLF procedure, wherein the first and second RLF procedures apply first and second time periods, respectively, from when the wireless device is considered to be out-of-sync until the wireless device is considered to be in a state of RLF, which second time period is longer than the first time period; and
generate a measurement report based on the first RLF procedure, which measurement report relates to measurements according to the first RLF procedure for determining when the wireless device is considered to be in the state of RLF.

12. The wireless device as claimed in claim 11, wherein the obtained information is at least partly received from a network node comprised in the wireless communication network.

13. The wireless device as claimed in claim 11, wherein the obtained information comprise one or more configuration parameters that configures the wireless device to apply the second RLF procedure.

14. The wireless device as claimed in claim 11, wherein the first and second RLF procedures apply first and second thresholds, respectively, for determining when the wireless device is considered to be out-of-sync, which second threshold allows for worse conditions than the first threshold before determining that the wireless device is considered to be out-of-sync.

15. The wireless device as claimed in claim 11, wherein the wireless device is further configured to: send the measurement report to a core network node comprised in the wireless communication network.

16. A network node for supporting a wireless device to manage radio link failures, "RLF", when the wireless device is served by a wireless communication network, the network node being configured to be comprised in the wireless communication network, a first, default, RLF procedure being associated with at least a first type of wireless devices supported by the wireless communication network, wherein the network node is further configured to:
obtain information indicative of a second RLF procedure based on that the wireless device is of a second type having an improved radio coverage capability compared to the first type, wherein the second RLF procedure is based on measurements on a different reference signal than the first RLF procedure;
send the obtained information to the wireless device, wherein the first and second RLF procedures apply first and second time periods, respectively, from when the wireless device is considered to be out-of-sync until the wireless device is considered to be in a state of RLF, which second time period is longer than the first time period; and
receive, from the wireless device, a measurement report, which measurement report has been generated by the wireless device based on the first RLF procedure, which measurement report relates to measurements according to the first RLF procedure for determining when the wireless device is considered to be in the state of RLF.

17. The network node as claimed in claim 16, wherein the obtained information comprises one or more configuration parameters for configuring the wireless device to apply the second RLF procedure.

18. The network node as claimed in claim 16, wherein the first and second RLF procedures apply first and second thresholds, respectively, for determining when the wireless device is considered to be out-of-sync, which second threshold allows for worse conditions than the first threshold before determining that the wireless device is considered to be out-of-sync.

19. The network node as claimed in claim 16, wherein the network node is further configured to: detect, based on the received measurement report, a subarea associated with radio coverage problems.

* * * * *